Patented Sept. 29, 1936

2,056,082

UNITED STATES PATENT OFFICE 2,056,082

METHOD OF TREATING EGG WHITES

Samuel Tranin, Kansas City, Mo.

No Drawing. Application February 20, 1933, Serial No. 657,671

3 Claims. (Cl. 99—113)

My invention relates to a method of producing dried egg products, and more particularly to a process of preparing and drying egg whites, or albumen.

In drying egg whites, it is necessary to remove undesirable components of the protein, such as chalazae and other portions which are subject to decomposition in order that the resultant product may be preserved for long periods without spoiling. The present method of removing objectionable matter from liquid egg whites is simply a process of fermentation brought about by the application of heat. In this process, liquid whites are kept at a temperature of about 90° F. for approximately 48 hours, or until a strong fermentation begins to bring about separation of the objectionable components which rise to the top of the liquid where they are removed by a skimming operation. After the undesirable components have been removed, fermentation of the remainder of the liquid is suspended by adding thereto a 2 percent ammonia solution which is also supposed to prevent further fermentation during dehydration of the liquid mass.

Dried egg whites produced by this method naturally have a very objectionable odor caused by the fermentation step and if the dehydration requires a long period of time fermentation again sets in, during the drying operation, resulting in a very low quality product.

The principal object of my invention is, therefore, to provide a dried albumen product, in either flake or powdered form, that is of high quality, and entirely free from objectionable odors.

Another important object of the present invention is to materially reduce the period of time required for treating or processing egg whites prior to dehydration of the albumen.

In accomplishing these objects I have found that the liquid egg whites may be processed with a "culture" prepared from a grain or vegetable product capable of acting with sugar to form a thick alcoholic mass. This culture may be produced by mixing, for example, rye flour, preferably in coarse form, with enough sugar and water to form a thick solution that is allowed to stand during which time it ferments and substantially doubles in volume.

The culture is then mixed with liquid egg whites. For best results, I find that the proportions of the mixture should be about 95 percent of egg whites to 5 percent of culture. The mixture should then be allowed to stand for about thirty hours during which time it becomes acidified and the culture separates from the mixture by rising to the top, carrying with it the objectionable components of the protein namely, the stringy matter and chalazae. This may be then skimmed off to leave a purified albumen which is capable of being dehydrated without fermenting.

The alcohols which have been formed by the culture are deposited in the albumen to act as a preservative similar to the acids above described.

The processed albumen is then dehydrated either by spraying it in the presence of heat to form a powder or by heating thin batches of albumen, which after drying, may be broken into flakes. In either instance the resulting product is of high quality, free from all disagreeable odors and may be kept indefinitely without deteriorating.

What I claim and desire to secure by Letters Patent is:

1. A method of treating egg whites including mixing liquid egg whites with a fermented alcoholic culture to form a mixture, allowing the mixture to acidify for effecting separation of the culture to carry with it the chalazae and stringy portions of the egg whites, and removing the separated culture and said portions of the egg whites from the purified albumen content of the egg whites.

2. In a method of treating egg whites, including fermenting a grain and sugar mixture to form an alcoholic culture, mixing liquid egg whites with the alcoholic culture to form a mixture, allowing the mixture to acidify for effecting separation of the culture to carry with it the chalazae and string portions of the egg whites, and removing the separated culture and said portions of the egg whites to leave a purified albumen content of the egg whites.

3. In a method of treating egg whites, including fermenting a vegetable and sugar mixture to form an alcoholic culture, mixing liquid egg whites with the alcoholic culture to form a mixture, allowing the mixture to acidify for effecting separation of the culture to carry with it the chalazae and stringy portions of the egg whites to leave a purified albumen content of the egg whites.

SAMUEL TRANIN.